United States Patent
Tsourikov et al.

[11] Patent Number: 6,167,370
[45] Date of Patent: Dec. 26, 2000

[54] DOCUMENT SEMANTIC ANALYSIS/ SELECTION WITH KNOWLEDGE CREATIVITY CAPABILITY UTILIZING SUBJECT-ACTION-OBJECT (SAO) STRUCTURES

[75] Inventors: Valery M. Tsourikov, Boston; Leonid S. Batchilo, Belmont, both of Mass.; Igor V. Sovpel, Minsk, Belarus

[73] Assignee: Invention Machine Corporation, Boston, Mass.

[21] Appl. No.: 09/321,804

[22] Filed: May 27, 1999

Related U.S. Application Data

[60] Provisional application No. 60/099,641, Sep. 9, 1998.

[51] Int. Cl.[7] .................................................. G06F 17/27
[52] U.S. Cl. ................................... 704/9; 707/4; 707/531
[58] Field of Search .................................. 704/1, 9, 10, 8, 704/7; 707/2, 3, 4, 5, 104, 530, 531, 532

[56] References Cited

U.S. PATENT DOCUMENTS

| | | | |
|---|---|---|---|
| 4,829,423 | 5/1989 | Tennant et al. | 704/8 |
| 4,864,502 | 9/1989 | Kucera et al. | 704/8 |
| 4,868,750 | 9/1989 | Kucera et al. | 704/8 |
| 4,887,212 | 12/1989 | Zamora et al. | 704/8 |
| 5,060,155 | 10/1991 | van Zuijlen | 704/9 |
| 5,146,405 | 9/1992 | Church | 704/9 |
| 5,331,556 | 7/1994 | Black, Jr. et al. | 704/9 |
| 5,369,575 | 11/1994 | Lamberti et al. | 704/9 |
| 5,377,103 | 12/1994 | Lamberti et al. | 704/9 |
| 5,424,947 | 6/1995 | Nagao et al. | 704/9 |
| 5,559,940 | 9/1996 | Hutson | 707/526 |
| 5,614,899 | 3/1997 | Tokuda et al. | 341/51 |
| 5,696,916 | 12/1997 | Yamazaki et al. | 345/356 |
| 5,761,497 | 6/1998 | Holt et al. | 707/5 |
| 5,799,268 | 8/1998 | Boguraev | 704/9 |
| 5,802,504 | 9/1998 | Suda et al. | 706/11 |
| 5,844,798 | 12/1998 | Uramoto | 704/2 |
| 5,873,056 | 2/1999 | Liddy et al. | 704/9 |
| 5,873,076 | 2/1999 | Barr et al. | 707/3 |
| 5,878,385 | 3/1999 | Bralich et al. | 704/9 |
| 5,933,822 | 8/1999 | Braden-Harder et al. | 707/5 |
| 6,076,051 | 8/1999 | Messerly et al. | 704/9 |

OTHER PUBLICATIONS

Fifth Conference On Applied Natural Language Processing, Mar. 31—Apr. 3, 1997, Association for Computational Linguisitics.

Software Agents, AAAI Press/The MIT Press, 1997, Chapter 10—Lifelike Computer Characters: The Persona Project at Microsoft, Gene Ball, Dan Ling, David Kurlander, John Miller, David Pugh, Tim Skelly, Andy Stankosky, David Thiel, Maarten Van Dantzich, and Trace Wax.

Software Agents, AAAI Press/The MIT Press, 1997, Chapter 12—The M System, Doug Riecken.

*Primary Examiner*—Joseph Thomas
*Attorney, Agent, or Firm*—Edward Dreyfus

[57] ABSTRACT

A computer based software system and method for semantically processing a user entered natural language request to identify and store linguistic subject-action-object (SAO) structures, using such structures as key words/phrases to search local and web-based databases for downloading candidate natural language documents, semantically processing candidate document texts into candidate document SAO structures, and selecting and storing only relevant documents whose SAO structures include a match with a stored request SAO structure. Further features include analyzing relationships among relevant document SAO structures and creating new SAO structures based on such relationships that may yield new knowledge concepts and ideas for display to the user and generating and displaying natural language summaries based on the relevant document SAO structures.

18 Claims, 12 Drawing Sheets

SOURCE SENTENCE

The present invention shields a noise of an external magnetic field with the slider and improves a recording performance because the slider is isolated magnetically.

FIG. 7

TAGGED SENTENCE

The_ATI present_JJ invention_NN shields_VBZ a_AT noise_NN of_IN an_AT external_JJ magnetic_JJ field_NN with_IN the_ATI slider_NN and_CC improves_VBZ a_AT recording_NN performance_NN because_CS the_ATI slider_NN is_BEZ isolated_VBN magnetically.

FIG. 8

SAO EXTRACTION

| SUBJECT | ACTION | OBJECT |
|---|---|---|
| THE PRESENT INVENTION | SHIELDS | A NOISE OF EXTERNAL MAGNETIC FIELD |
| THE PRESENT INVENTION | IMPROVES | A RECORDING PERFORMANCE |
| | IS ISOLATED | THE SLIDER |

FIG. 12

SAO EXTRACTION (NORMALIZED)

| SUBJECT | ACTION | OBJECT |
|---|---|---|
| PRESENT INVENTION | SHIELD | NOISE OF EXTERNAL MAGNETIC FIELD |
| PRESENT INVENTION | IMPROVE | RECORDING PERFORMANCE |
| | ISOLATE | SLIDER |

FIG. 13

DOCUMENT SEMANTIC ANALYSIS/ SELECTION WITH KNOWLEDGE CREATIVITY CAPABILITY UTILIZING SUBJECT-ACTION-OBJECT (SAO) STRUCTURES

REFERENCE TO PRIORITY APPLICATION

This application claims the benefit of U.S. Provisional Application No. 60/099,641, filed Sep. 9, 1998.

BACKGROUND

The present invention relates to computer based apparatus for and methods of semantically analyzing, selecting, and summarizing candidate documents containing specific content or subject matter.

Computer based document search processors are known to perform key word searches for publications on the Internet and World Wide Web. Today, information owners and service providers are adapting their data bases to individual tastes and requirements. For example, Boston based Agents, Inc. offers over the Web personalized newsletters for music fans such that classical music lovers are blocked from receiving Rap music ads and vice-versa. KD, Inc. of Hong Kong has developed a system that takes into consideration words similar by sense while searching the Web. Today the user can download 10,000 papers from the Web by typing the word "Screen". The search system designed by KD, Inc. asks the user whether he/she is seeking papers related to Computer Screen, TV Screen or Window Screen. In this case, the number of unrelated papers will be drastically reduced.

Software based search processors are able to remember requests of single user and to conduct personalized non-stop searches on the Web. So, when a user wakes up in the morning he/she finds references and abstracts of several new Web papers, related to his/her area of interest. In 1997, practically all fundamental technical publications, journals, magazines, as well as patents of all industrial countries became available on the Web, i.e. available in electronic format.

Although key word searching the Web affords the user great value, it also has created and will continue to create substantial problems adversely affecting this value. Specifically, because of the enormous amount of information available on the Web, key word search processors produce too much downloaded information, the vast majority of which is irrelevant or immaterial to the information the user wants. Many users simply give up in frustration when presented with several hundred articles in response to what the user considered a request for only those few articles related to a specific request.

This problem is also experienced in the technical fields of science and engineering, particularly since there is a growing number of libraries, government patent offices, universities, government research centers, and other adding vast amounts of technical and scientific information for Web access. Engineers, scientists, and doctors are overwhelmed with too many articles, papers, patents and general information on the topic of interest to them. In addition, the user presently has only two choices when examining a download article to determine its relevance to the users project. He/she can either read the authors abstract and/or scan various sections of the full article to determine whether or not to save or print-out that specific document. Since the author's abstract is not comprehensive, it often omits the reference to the specific subject matter of interest to the user or treats this subject matter in an incomprehensive manner. Thus, scanning the abstract and scanning the full article may have little value and require an inordinate amount of user time.

Various attempts purport to increase the recall and precision of the selection such as U.S. Pat. Nos. 5,774,833 and 5,794,050 incorporated here by reference, however, these methods simply rely on key word or phrase searching with various techniques of selection based on variations of the key words, or purported understanding of textual phrases. These prior methods may improve recall but may still requires too much physical and mental effort and time to determine why the document was selected and what is the pertinent part. This results from the entire document or abstract being presented without summary or concept generation.

SUMMARY OF EXEMPLARY EMBODIMENT OF PRESENT INVENTION

A computer based software system and method according to the principles of the present invention solves the foregoing problems and has the ability to perform a non-stop search of all databases on the Web or other network for key words and to semantically process candidate documents for specific technological functions and specific physical effects so that only the very few prioritized or a single article meeting the search criteria is presented or identified to the user.

Further, the computer based software system in accordance with the principles of the present invention captures these few highly relevant documents and creates a compressed, short summary of the precise technical or physical aspects designated by the search criteria.

Another aspect of the present invention includes using the semantic analysis results of the selected documents to create new ideas of knowledge concepts. The system does this by analyzing the subjects, actions, and objects mentioned in the documents and re-organizing these representations into new and/or different profiles of such elements. As further described below, some of these reorganized sets of relationships among these elements may comprise new concepts never before thought of by anyone.

According to an aspect of the present invention, the method and apparatus begins with the user entering natural language text related to the task or concept for which the user desires to acquire publications or documents. The system analyzes this request text and automatically tags each word with a code that indicates the type of word it is. Once all words in the request are tagged, the system performs a semantic analysis that, in one example, includes determining and storing the verb groups within the first sentence of the request, then determining and storing the noun groups within that sentence of the request. This process is repeated for all sentences in the request.

Next, the system parses each request sentence with an heircal algorithm into a coded framework which is substantially indicative of the sense of the sentence. The system includes databases of various types to aid in generating the coded framework, such as grammar rules, parsing rules, dictionary synonyms, and the like. Once parsed sentence codes are stored, the system identifies Subject-Action-Object (SAO) extractions within each sentence and stores them. A sentence can have one, two, or a plurality of SAO extractions as seen in the detailed description below. Each extraction is normalized into a SAO structure by processing extractions according to certain rules described below. Accordingly, the result of the semantic analysis routine performed on the request text is a series of SAO structures indicative of the content of the request. These request SAO structures are applied to (1) a comparative module for comparing the SAO structures of candidate documents as described below and (2) a search request and key word generator that identifies key words and key combinations of words, and synonyms thereof, for searching the Web internet, intranet, and local data bases for candidate documents. Any suitable search engine, e.g. Alta Vista, can be used to identify, select, and download candidate documents based on the generated key words.

It should be understood that, as mentioned above, key word searching produces an over-abundance of candidate documents. However, according to the principles of the present invention, the system performs substantially the same semantic analysis on each candidate document as performed on the user input search request. That is, the system generates an SAO structure(s) for each sentence of each candidate document and forwards them to the comparative Unit where the request SAO structures are compared to the candidate document SAO structures. Those few candidate documents having SAO structures that substantially match the request SAO structure profile are placed into a retrieved document Unit where they are ranked in order of relevance. The system then summarizes the essence of each retrieved document by synthesizing those SAO structures of the document that match the request SAO structures and stores this summary for user display or printout. Users can later read the summary and decide to display or print out or delete the entire retrieved document and its SAO's.

As stated above, the SAO structures for each sentence for each retrieved document are stored in the system according to the present invention. According to the knowledge creativity aspect of the present invention, the system analyzes all these stored structures, identifies where common or equivalent subjects and objects exist and reorganizes, generates, synthesizes, new SAO structures or new strings of SAO structures for user's consideration. Some of these new structured or strings may be unique and comprise new solutions to problems related to the user's requested subject matter. For example, if two structures S1-A1-O1 and S2-A2-O2 are stored, and the present system recognizes that S2 is equivalent to or the synonym for or has some other relation to O1 then it will generate and store for the user's access a summary of S1-A1-S2-A2-O2. Of if the system stores an association between S1 and A2 it can generate S1-A1/A2-O1 to suggest improvement of O1 toward desired results.

Other and further advantages and benefits shall become apparent with the following detailed description when taken in view of the appended drawings, in which:

DRAWING DESCRIPTION

FIG. 7 is a typical example of the user request text entered by user.

FIG. 8 is a tagged and coded representation version of text of FIG. 7.

FIG. 12 is a representation of SAO extract ion of the text of FIG. 7.

FIG. 13 is a representation of SAO structures of the extraction of FIG. 12.

DETAILED DESCRIPTION OF EXEMPLARY EMBODIMENTS

Figure 1:
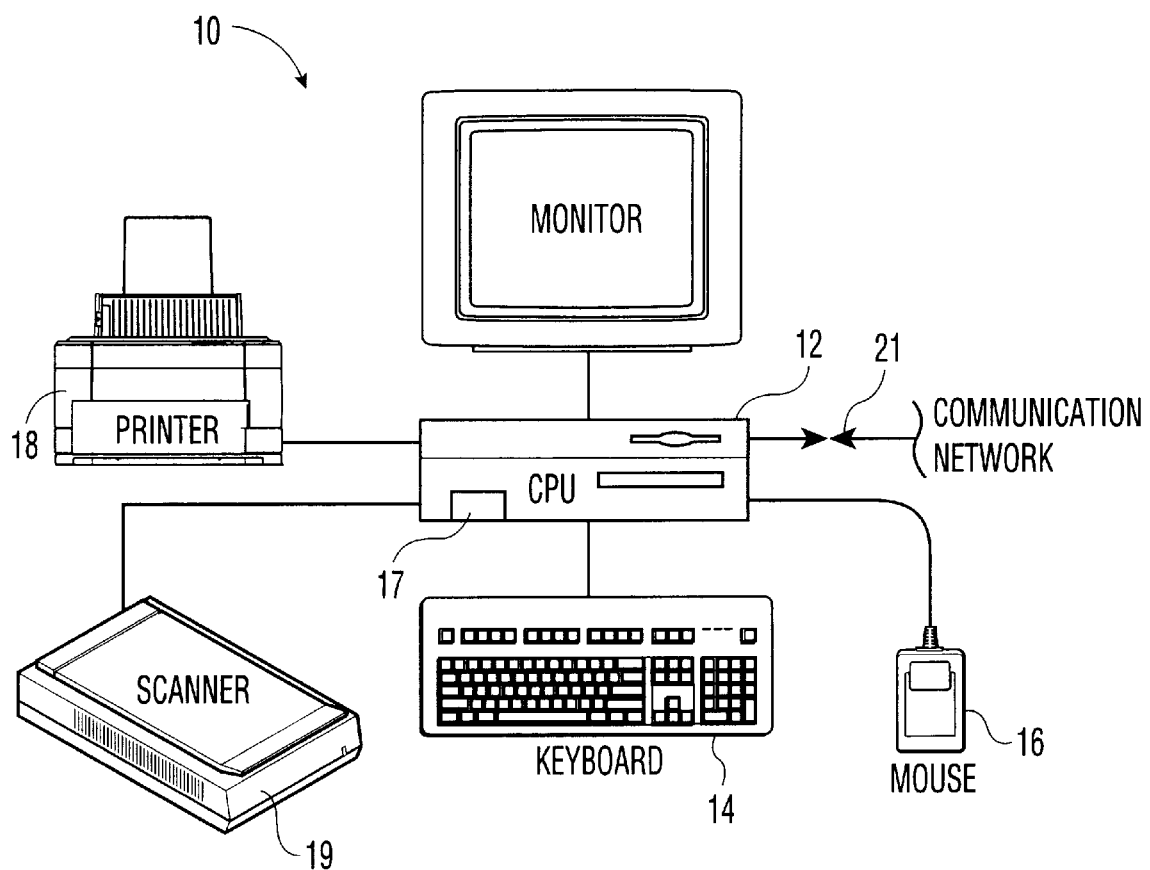
FIG. 1 is a pictorial representation of one exemplary embodiment of the system according to the principles of the present invention.

One exemplary embodiment of a semantic processing system according to the principles of the present invention includes:

A CPU 12 that could comprise a general purpose personal computer or networked server or minicomputer with standard user input and output driver such as keyboard 14, mouse 16, scanner 19, CD reader 17, and printer 18. System 10 also includes standard communication ports 21 to LANs, WANs, and/or public or private switched networks to the Web.

With reference to FIGS. 1–6, the semantic processing system 10 includes a temporary storage or data base 12 for receiving and storing documents downloaded from the Web or local area net or generated as a user request text with use of keyboard 14 or one of the other input devices. User can type the request, examples disclosed below, or enter full documents into DB 12 and designate the document as user's request. System 10 further includes semantic processor 14 for receiving the entire text of each document and includes a Subject-Action-Object (SOA) analyzer Unit 16 that tags each word of each sentence with a code type (such as Markov chain theory code). Unit 16 then identifies each verb group and noun group, (described below) within each sentence, and parses and normalizes each sentence into SAO structures that represents the sense of the sentence. Unit 16 applies its output to DB of SAO structures 18. SAO processor Unit 20 stores the request SAO structures and receives the SAO structures of each sentence of each document stored in Unit 18. Unit 20 compares the document SAO's to the request SAO's and deletes out those documents with no matches. The SAO structures of matched documents are stored back in Unit 18 or some other storage facility. In addition, Unit 20 analyzes SAO structures within a single document or with those of one or more other relevant documents, searches for relationships among S-A-O's and generates new SAO structures for user consideration. These new structures are stored in Unit 18 or some other storage facility in the system.

Unit 14 further includes natural language Unit 22 that receives SAO structures in table form and synthesizes structures into natural language form, i.e. sentences.

Unit 14 also includes keyword Unit 24 for receiving SAO structures and extracts key words and phrases from them and acquires their synonyms for use as additional key words/phrases.

Database Units 26, 28, and 30 receive the outputs from Unit 14, generally as shown, for storing the natural language summaries of selected SAO structures as described below and the key words/phrases that form user request sent to search engines through port 21.

Figure 4:
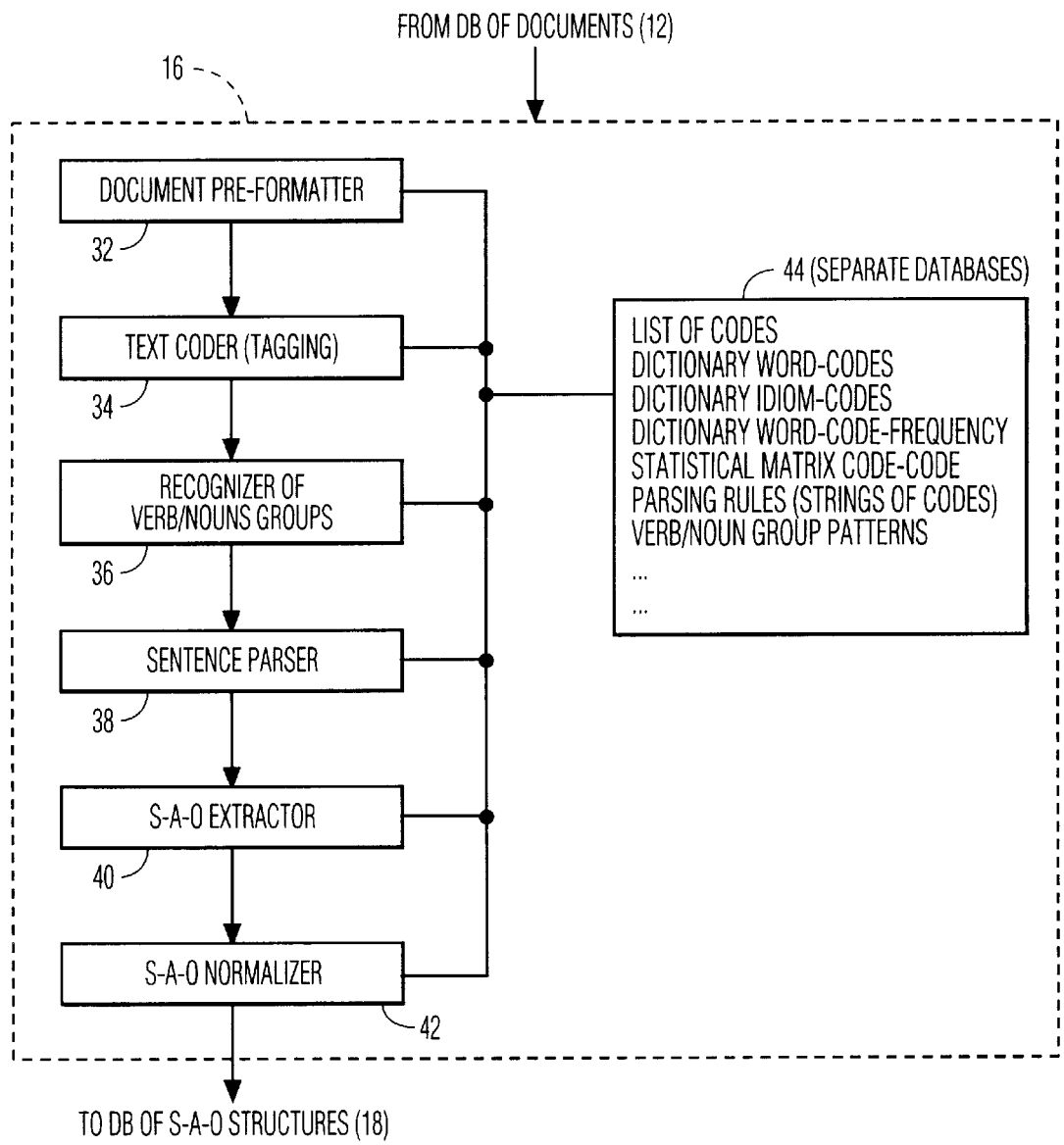
FIG. 4 is a schematic representation of Unit 16 of FIG. 2.
Figure 5:
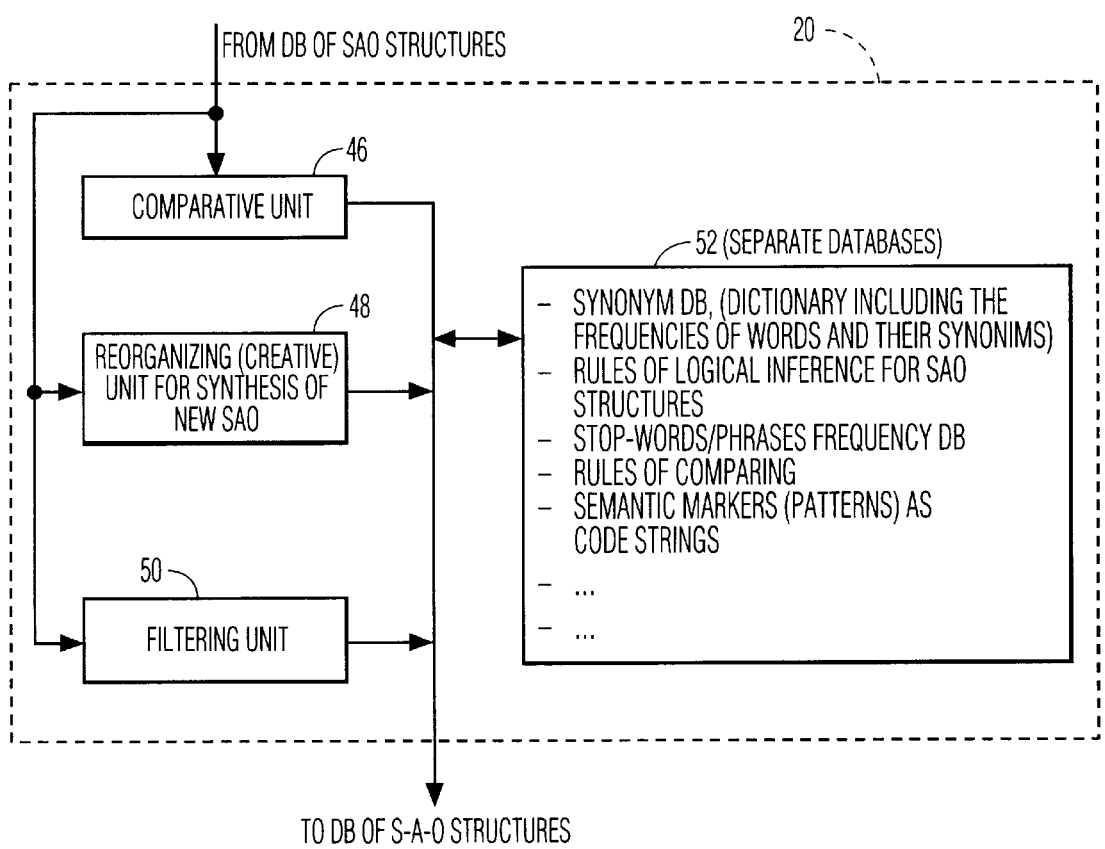
FIG. 5 is a schematic representation of Unit 20 of FIG. 2.
Figure 6:
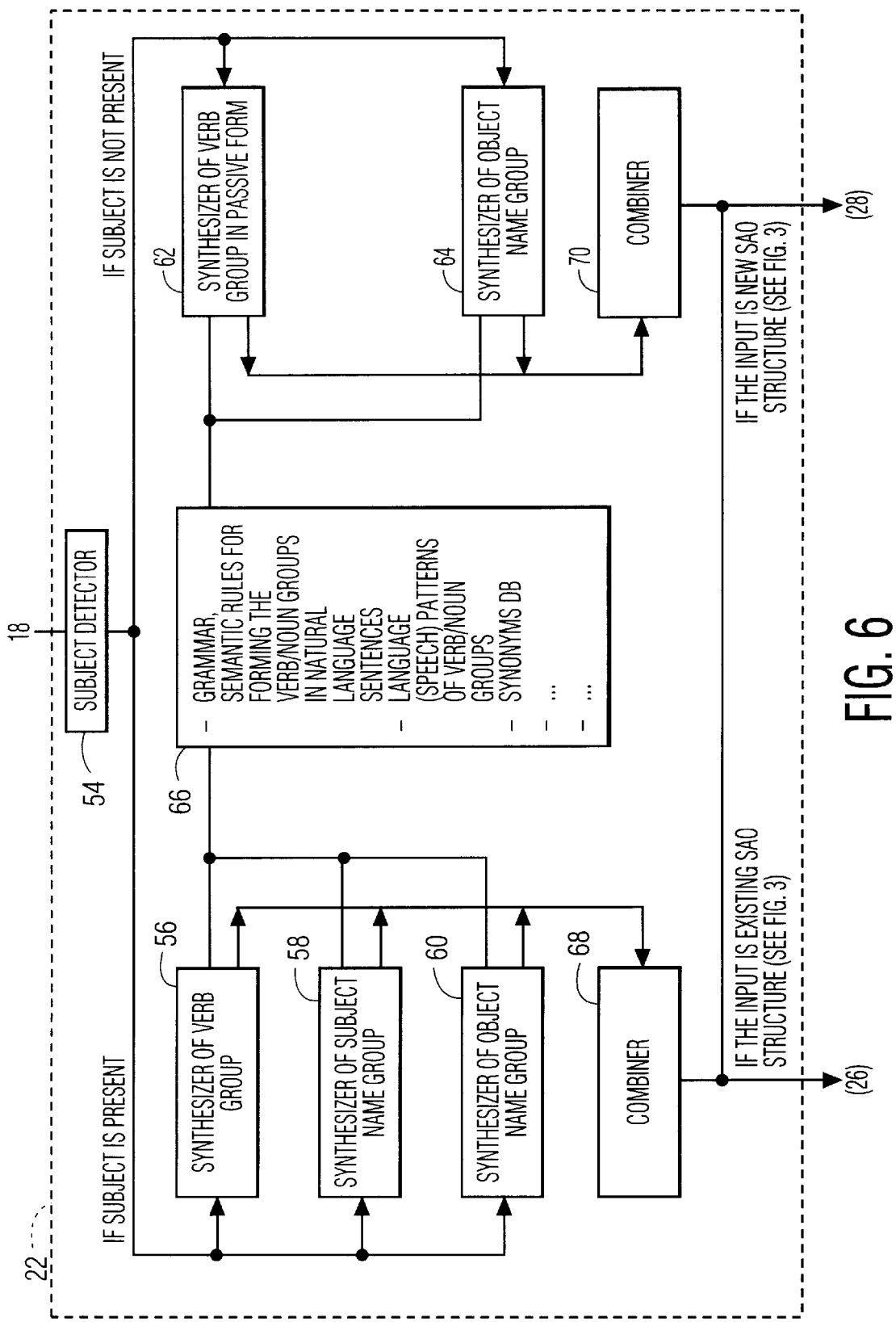
FIG. 6 is a schematic representation of Unit 22 of FIG. 2.
Figure 9:
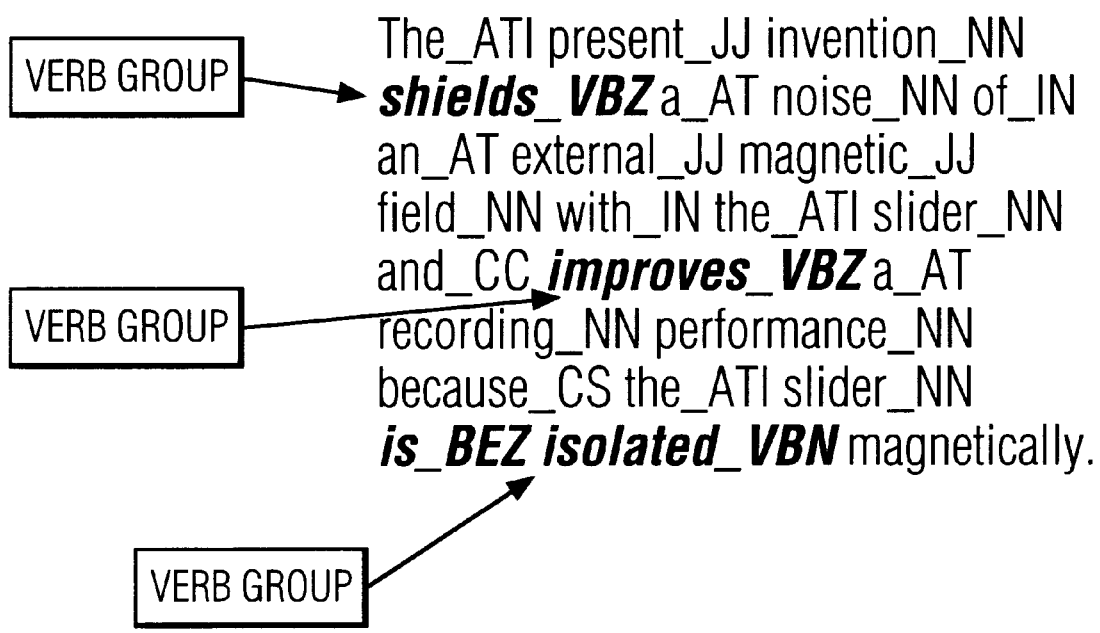
FIG. 9 is an identification of verb groups of the text of FIG. 8.
Figure 10:
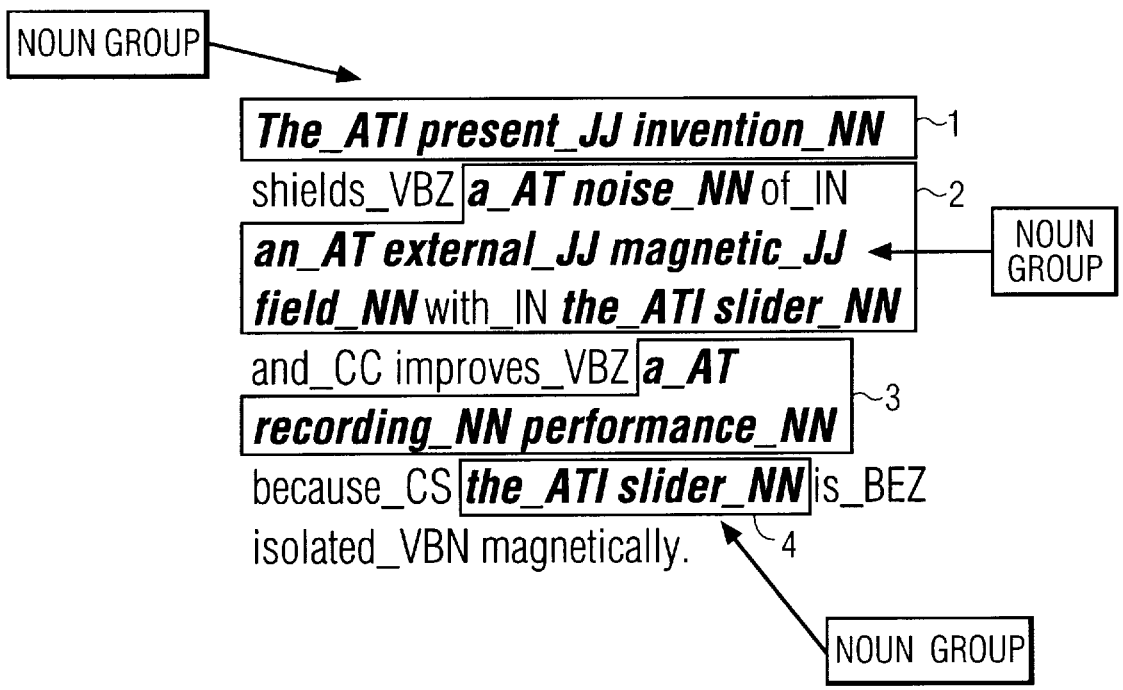
FIG. 10 is an identification of noun groups of the coded text of FIG. 8.
Figure 11:
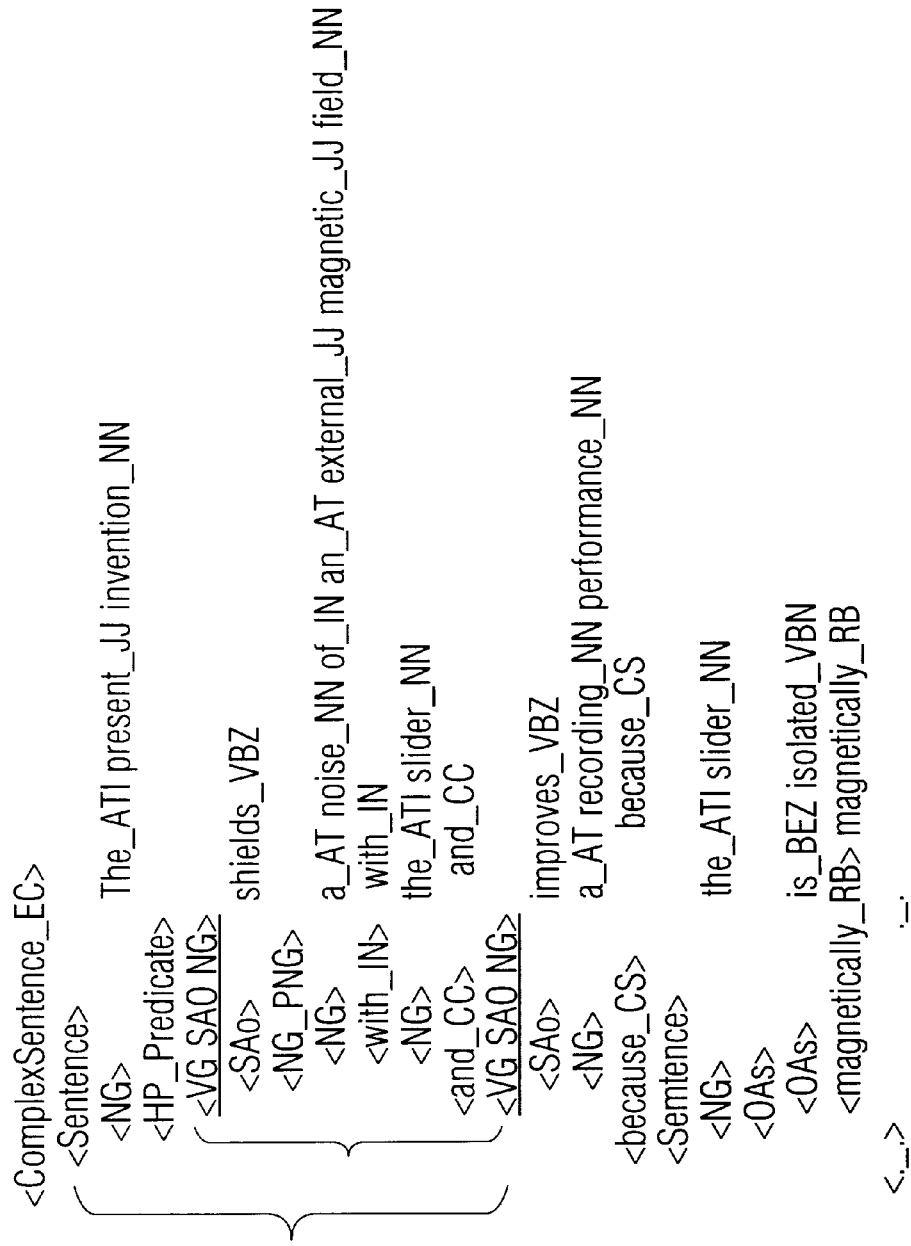
FIG. 11 is a representation of parsed hierarchy coded text of FIG. 8.

Unit 16 includes document pre-formatter 32 that receives full text of documents from Unit 12 and converts the text and other contents to a standard plain text format. Text coder 34 analyzes each word of each sentence of text and tags a code to every word which code designates the word type, see FIG. 8. Various data bases designated 44 in FIG. 4 are available to aid the Units of Unit 16. Following tagging, recognizer Unit 36 identifies the verb groups (FIG. 9) and the noun groups of each sentence (FIG 10). Sentence parser 38 then parses each sentence into a hierarchical coded form that represents the sense of the sentence. FIG. 11. S-A-O extractor 40 organizes the SAO's of each sentence into extracted table format (FIG. 12). Then normalizer 42 normalizes the extractions into SAO structures as described above (FIG. 13).

SAO processor 20 includes three main Units. Comparative Unit 46 receives SAO structures from database 18. One set of these structures originates from the user request text de scribed above and other sets originate from the candidate documents. Unit 46 then compares these two sets looking for matches between SAO structures of these two sets. If no match results, then the candidate document and associated SAO's are deleted. If a match is identified then the document is marked relevant and ranked and stored in Unit 12 and its SAO structures stored in Unit 18. Unit 46 then compares all candidate documents in sequence and in the same way as described.

Unit 20 also includes the SAO structure reorganizing Unit 48 to synthesize new SAO structures from different documents on the same matter and combines them into the new structure, as described above, and applies them to Unit 18.

Filtering Unit 50 analyzes every SAO structure of each document and blocks or deletes those not relevant to the SAO structures of the request.

Reference 52 designates some of the data bases available to aid sub-units of Unit 20.

SAO synthesizer Unit 22 (FIG. 6) includes a Subject detector 54 for detecting the content of the subject for each received SAO structure. If S is detected then the SAO is fed to Unit 56 in which the tree structure of the verb group(s) is restored to natural language using grammar, semantic, speech pattern, and synonym rules data base 66. Synthesizer 58 does the same for subject noun groups and synthesizer 60 does the same for object noun groups. Combiner 68 then organizes and combines these groups into a natural language sentence.

If S was not detected by Unit 54, the SAO structures are processed by synthesizer 62 to restore the verb group in passive form. Synthesizer 64 processes the object noun group for a passive sentence and combiner 70 to organize and combine the groups into a natural language sentence.

If SAO structures received by Unit 54 bear new structure markings, then combiners 68 and 70 apply their output to Unit 28 and if they were marked existing SAO structure, then units 68, 70 apply output to Unit 26. See FIG. 3.

Figure 2:
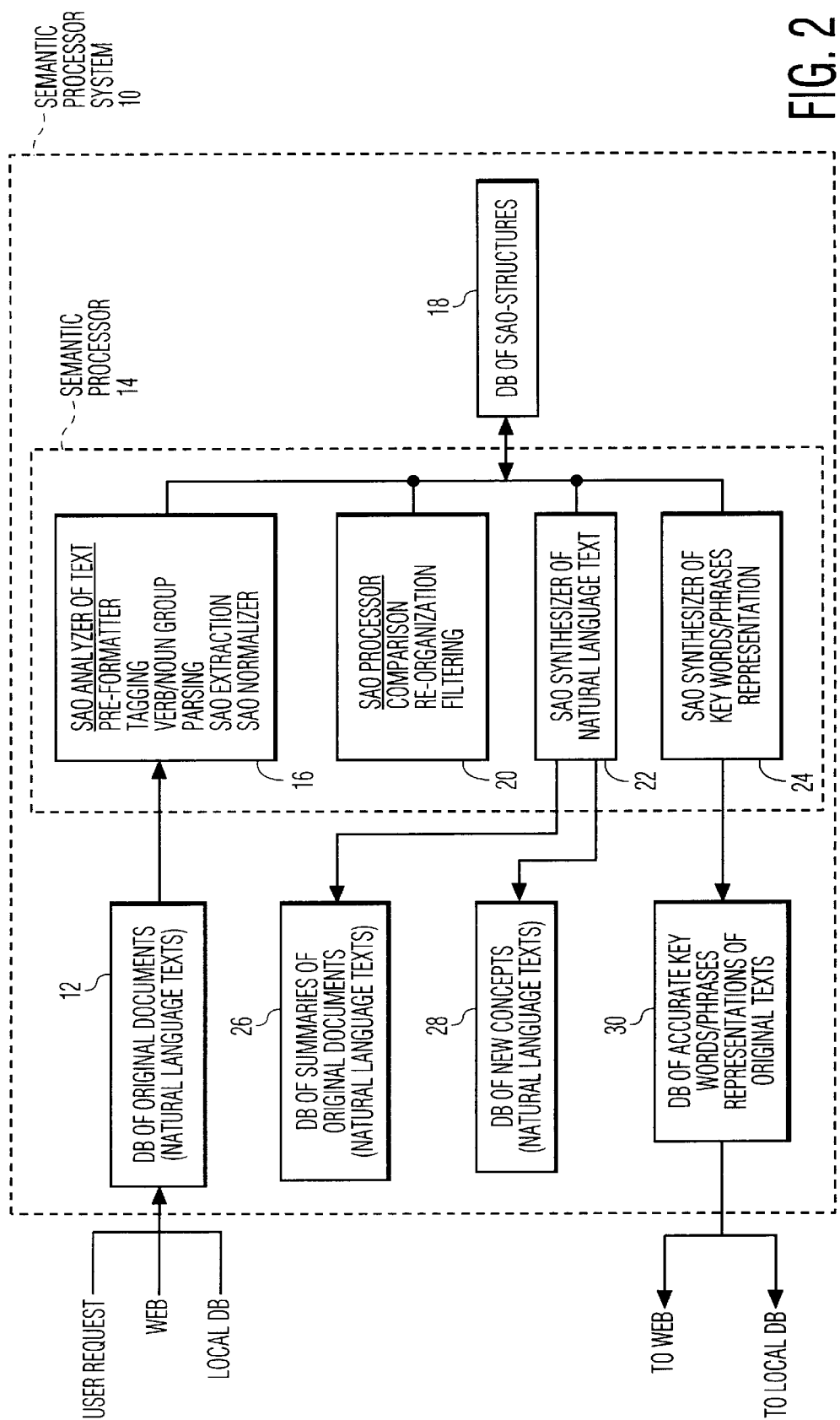
FIG. 2 is a schematic representation of the main architectural elements of the system according to the present invention.
Figure 3:
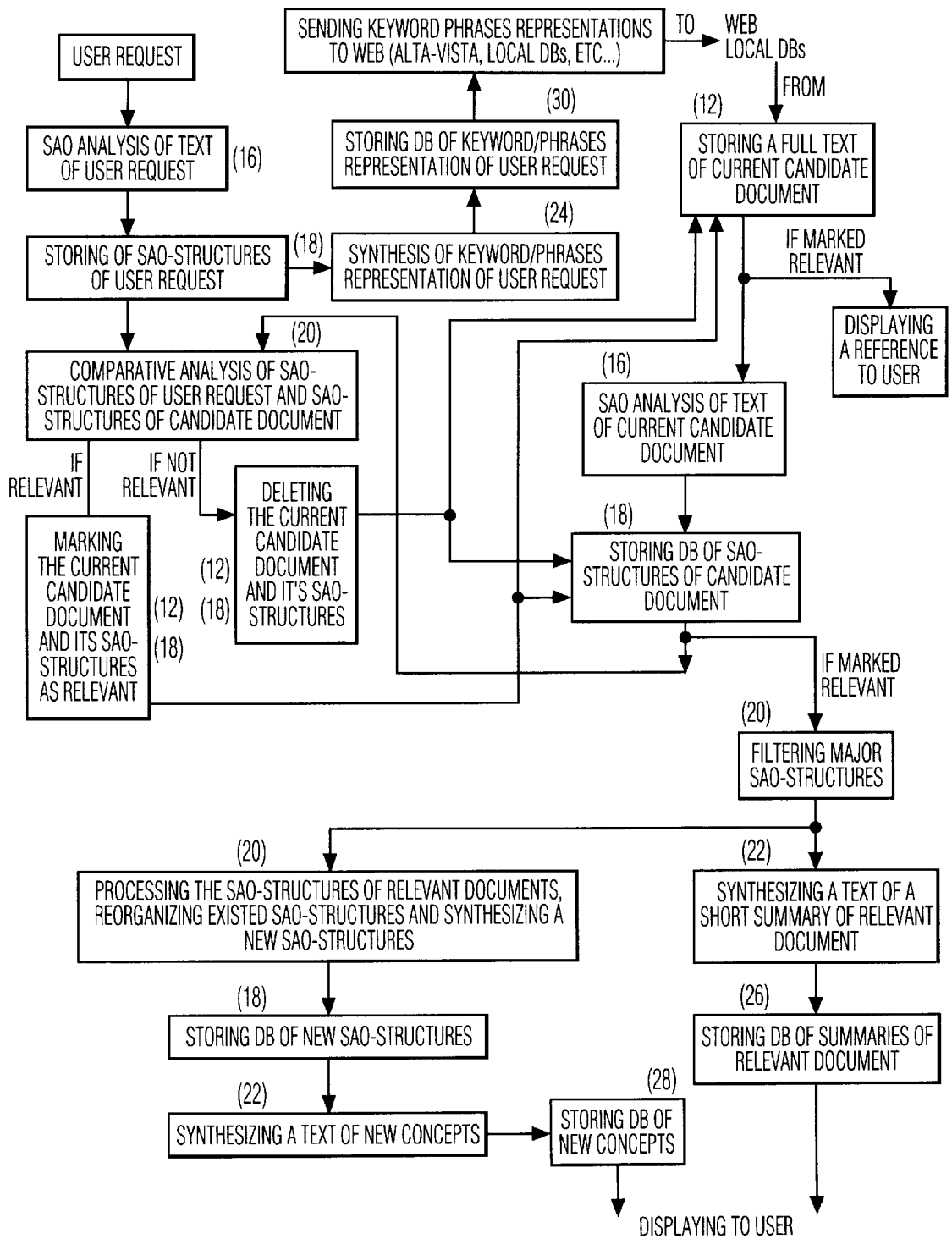
FIG. 3 is a schematic representation of the method according to the principles of the present invention.

The salient steps to the method according to the principles of the present invention are shown in FIG. 3, where the number in the parenthesis refer to the Units of FIG. 2 where the process steps takes place. A session begins with the user inputting a natural language request which could be customized with the use of the keyboard or could be a natural language document entered via one of the input devices shown in FIG. 1. A typical user generates customized request as shown in FIG. 7. System 10 Unit 14, then by first tagging each word with a type code (See FIG. 8) then identifying the verb groups of each sentence (FIG. 9) and noun groups of each sentence (FIG. 10) then processing each sentence into an hierarchical tree (FIG. 11) and then extracting the SAO extractions where all extracted words are the originals of the request (FIG. 12). Then the method normalizes these words (modifies) each as each action is changed to its infinitive form. Thus, "is isolated" FIG. 12 is changed to "ISOLATE", the word "to" being understood (FIG. 13). It should be understood that not all attributes of the subject, action and objects appearing in FIG. 11 are shown in FIGS. 12 and 13, but the system knows the full attributes associated with the SAO elements and these attributes are part of the SAO structure. Also, note in FIG. 13, no subject is listed for the last action because is indicated pursuant to the planning rules. This absence does not affect the reliability of the overall method because all sentences of the candidate documents the include an A-O of Isolate-slides will be considered a matter regardless of the subject. The normalized SAO's are called herein as SAO structures. These users request SAO structures are stored and applied in two following steps (i) synthesis of key word/phrases of user request; (ii) a comparative analysis of SAO structure of each sentence of each candidate documents as described below.

The request SAO structure key words/phrases are stored and sent to a standard search engine to search for candidate documents in local databases, LANs and/or the Web. AltaVista™, Yahoo™, or other typical search engines could be used. The engine, using the request SAO structure key words/phrases identifies candidate documents and stores them (full text) for system 10 analysis. Next the SAO analysis as described above for the search request is repeated for each sentence of each candidate document so that SAO structures are generated and stored as indicated in FIG. 3. In addition, the SAO structures of each document are used in the comparative steps where the request SAO structures are compared with the candidate document SAO structures. If no match is found then the documents and related SAO structures are deleted from the system. If one or more matches are found then the document and related structures are marked relevant and its relevancy marked for example on a scale of 1.0 to 10.0. The fill relevant document text is permanently stored (although it can later be deleted by user if desired) for display or print-out as user desires. Relevant SAO structures are also marked relevant and permanently stored.

Next System 10 filters out the least relevant SAO structures and uses the matched SAO structures of each relevant documents to synthesis into natural language summary sentences(s) the matched SAO structures and the page number where the complete sentence associated with the matched SAO structures appears. This summary is stored and available for users display or print-out as desired.

Filtered relevant SAO structures of relevant document(s) are analyzed to identify relationships among the subjects, actions, and objects among all relevant structures. Then SAO structures are processed to reorganize them into new SAO structures for storage and synthesis into natural language new sentence(s). The new sentences may and probably some of them will express or summarize new ideas, concepts and thoughts for users to consider. The new sentences are stored for user display or print-out.

For example, if $S_1$-$A_1$-$O_1$ $S_2$-$A_2$-$O_2$ $S_3$-$A_3$-$O_3$ and $S_1$, is the same as or a synonym of $O_3$ then $S_3$-$A_3$-$S_1$-$A_1$-$O_1$ is synthesized into a new sentence and stored.

Accordingly, the method and apparatus according to the present invention provides user automatically with a set of new ideas directly relating to user's requested area of interest some of which ideas are probably new and suggest possible new solutions to user's problems under consideration and/or the specific documents and summaries of pertinent parts of specific documents related directly to user's request.

Although mention has been made herein of application of the present system and method to the engineering, scientific and medical fields, the application thereof is not limited thereto. The present invention has utility for historians, philosophers, theology, poetry, the arts or any field where written language is used.

It will be understood that various enhancements and changes can be made to the example embodiments herein disclosed without departing from the spirit and scope of the present invention.

We claim:

1. A natural language document analysis and selection system comprising, a general purpose computer having a monitor, a central processing unit (CPU), a user input device for generating request data representing a natural language request, and a communications device for communication with local and remote natural language document databases, said CPU comprising storage means for storing the request data, a semantic processor for generating request subject-action-object (SAO) extractions in response to receiving request data and representations of the request SAO extractions, and said storage means for storing said representations of the request SAO extractions, and wherein said communication device for sending to local or remote databases search data representative of at least one of said request SAO extractions and for conveying to said CPU candidate document data related to the search data for storage in said storage means, the candidate document data representing natural language document text, said semantic processor for generating candidate document SAO extractions in response to receiving candidate document data, and representations of the candidate document SAO extractions, and said storage means also storing the representations of candidate document SAO extractions.

2. A system as set forth in claim 1, wherein said semantic processor identifies matches between said representations of said request SAO extractions and representations of said candidate document SAO extractions.

3. A system as set forth in claim 2, wherein said semantic processor comprises means for marking as relevant candidate document data that includes at least one representation of candidate document SAO extraction that matches at least one representation of request SAO extraction.

4. A system as set forth in claim 3, wherein said semantic processor comprises means for deleting stored candidate document data and stored representations of candidate document SAO extractions for those documents that have no representation of candidate document SAO extraction that matches a representation of request SAO extraction.

5. A system as set forth in claim 2, wherein said semantic processor includes an SAO text analyzer having a plurality of stored text formatting rules, coding rules, word tagging rules, SAO recognizing rules, parsing rules, SAO extraction rules, and normalizing rules for applying such rules to the request data and candidate document data such that said representations of candidate document SAO extractions and of request SAO extractions comprise candidate document SAO structures and request SAO structures, respectively.

6. A system as set forth in claim 5 further comprising means for synthesizing request SAO structures for generating and applying synthesized SAO structures as search words/phrases to said communication device for application to document search engines on the WEB or local databases to cause downloading of candidate document data to the system.

7. A system as set forth in claim 5 further comprising an SAO synthesizer for generating and storing for display on said monitor natural language summaries of marked documents at least partially in response to receipt of document SAO structures.

8. A system as set forth in claim 5 further comprising an SAO synthesizer for analyzing relationships among subjects, actions, and objects among relevant and stored SAO structures and processing those SAO structures that have a relationship with at least one other SAO structure to generate a different SAO structure and storing the different SAO structure for display to the user.

9. A system as set forth in claim 8 wherein said relationship comprises:

$S_1$-$A_1$-$O_1$
$S_2$-$A_2$-$O_2$
where $S_1$ synonym $O_2$
Then $S_2$-$A_2$-$S_1$-$A_1$-$O_1$.

10. In a digital data processing system including the World Wide Web and a general purpose computer having a monitor, a central processing unit (CPU), a user input device, and a communications device for communication with local and remote natural language document databases, the method of analyzing and selecting natural language documents comprising, generating request data representing a natural language request, storing the request data, semantically processing the request data to generate request subject-action-object (SAO) extractions and representations of the request SAO extractions, and storing representations of the request SAO extractions, and sending through the communication device to local or remote databases search data representative of at least one of said request SAO extractions and conveying to said CPU candidate document data related to the search data, the candidate document data representing natural language document text, storing the candidate document data, semantically processing the candidate document data for generating candidate document SAO extractions in relation to the candidate document data and generating representations of the candidate document SAO extractions, and storing the representations of the candidate document SAO extractions.

11. A method as set forth in claim 10, further including identifying matches between said representations of said request SAO extractions and said representations of the candidate document SAO extractions.

12. A method as set forth in claim 11, wherein said semantically processing comprises marking as relevant candidate document data that includes at least one representation of candidate document SAO extraction that matches at least one representation of request SAO extraction.

13. A method as set forth in claim 12, wherein said semantically processing comprises deleting access to stored candidate document data and stored representations of candidate document SAO extractions for those documents that have no representation of candidate document SAO extraction that matches a representation of request SAO extraction.

14. A method as set forth in claim 11, wherein said semantically processing includes applying a plurality of stored text formatting rules, noun and verb recognition rules, coding rules, word tagging rules, SAO recognizing rules, parsing rules, SAO extraction rules, and normalizing rules to the request data and candidate document data such that said representations of candidate document SAO extractions and representations of request SAO extractions comprise candidate SAO structures document and request SAO structures, respectively.

15. A method as set forth in claim 14 further comprising synthesizing request SAO structures and generating and applying synthesized SAO structures as search words/phrases to document search engines on the WEB or local databases to cause downloading of candidate document data to the CPU.

16. A method as set forth in claim 14 further comprising generating and storing and displaying on said monitor natural language summaries of marked relevant documents in relation to the respective relevant document SAO structures.

17. A method as set forth in claim 14 further comprising analyzing relationships among subjects, actions, and objects among relevant and stored SAO structures, further processing those SAO structures that have a relationship with at least one other relevant and stored SAO structure, and generating a different SAO structure based at least partially on the said relationship, and storing the different SAO structure and displaying the different SAO structure to the user.

18. A method as set forth in claim 17 wherein said relationship comprises:

$S_1$-$A_1$-$O_1$ comprises one relevant and stored SAO structure $S_2$-$A_2$-$O_2$ comprises a second relevant and stored SAO structure where said relationship comprises $S_1$ synonym $O_2$ and the different SAO structure is $S_2$-$A_2$-$S_1$-$A_1$-$O_1$.

* * * * *